(12) United States Patent
Nomura

(10) Patent No.: US 7,623,963 B2
(45) Date of Patent: Nov. 24, 2009

(54) IN-VEHICLE NAVIGATION DEVICE

(75) Inventor: Tomoo Nomura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 905 days.

(21) Appl. No.: 11/280,351

(22) Filed: Nov. 17, 2005

(65) Prior Publication Data

US 2006/0116815 A1    Jun. 1, 2006

(30) Foreign Application Priority Data

Nov. 29, 2004    (JP)    ............... 2004-344806

(51) Int. Cl.
*G01C 21/34*    (2006.01)
(52) U.S. Cl. ..................................... 701/210
(58) Field of Classification Search ................. 701/210
See application file for complete search history.

(56) References Cited

U.S. PATENT DOCUMENTS

| | | | |
|---|---|---|---|
| 6,317,685 B1 * | 11/2001 | Kozak et al. ................. 701/210 |
| 6,321,161 B1 * | 11/2001 | Herbst et al. ................. 701/210 |
| 6,356,836 B1 * | 3/2002 | Adolph ........................ 701/208 |
| 6,418,373 B1 | 7/2002 | Omi et al. |
| 6,510,384 B2 * | 1/2003 | Okano ......................... 701/209 |
| 6,708,113 B1 * | 3/2004 | Von Gerlach et al. ........ 701/210 |
| 6,732,048 B2 * | 5/2004 | Blewitt ........................ 701/210 |
| 2002/0128766 A1 * | 9/2002 | Petzold et al. ............... 701/201 |
| 2002/0128773 A1 * | 9/2002 | Chowanic et al. ........... 701/210 |
| 2002/0143464 A1 * | 10/2002 | Blewitt ........................ 701/202 |
| 2003/0225508 A9 * | 12/2003 | Petzold et al. ............... 701/201 |
| 2004/0073362 A1 * | 4/2004 | Fabian et al. ................ 701/210 |
| 2005/0021227 A1 * | 1/2005 | Matsumoto et al. ......... 701/207 |
| 2006/0224302 A1 * | 10/2006 | Kwok et al. ................. 701/200 |

FOREIGN PATENT DOCUMENTS

| | | |
|---|---|---|
| JP | A-2000-193471 | 7/2000 |
| JP | A-2001-174278 | 6/2001 |
| JP | A-2002-181573 | 6/2002 |

* cited by examiner

*Primary Examiner*—Thomas G Black
*Assistant Examiner*—Shelley Chen
(74) *Attorney, Agent, or Firm*—Posz Law Group, PLC

(57) ABSTRACT

When a vehicle deviates from an initial route, a deviation route is memorized. Thereafter, when the vehicle comes back to the initial route, a cost is compared between the deviation route and a non-traveled route included in the initial route. When the cost of the deviation route is larger, the non-traveled route is supposed to be impassable due to road traffic closure or the like and then a detour coefficient is assigned to links included in the non-traveled route. When a route retrieval is conducted next, a cost of a link to which the detour coefficient is assigned is increased based on the detour coefficient. The detour coefficient is increased depending on a frequency of detouring.

8 Claims, 7 Drawing Sheets

DETOUR COEFFICIENT=1.5

| LINK ID | COEFFICIENT | |
|---|---|---|
| 00000012 | 1.5 | |
| 00000013 | 1.5 | |
| 00000020 | 2.25 | ⎫ |
| 00000021 | 2.25 | ⎬ TWICE |
| 00000023 | 2.25 | ⎭ |
| 00000101 | 1.5 | |
| 00000102 | 1.5 | |

DETOUR COEFFICIENT=1.5

| LINK ID | DIRECTION | COEFFICIENT |
|---------|-----------|-------------|
| 00000012 | EAST | 1.5 |
| 00000013 | EAST | 1.5 |
| 00000020 | NORTH | 2.25 |
| 00000021 | NORTH | 2.25 |
| 00000023 | NORTH | 2.25 |
| 00000101 | WEST | 1.5 |
| 00000102 | WEST | 1.5 |

(NORTH rows: TWICE)

IN-VEHICLE NAVIGATION DEVICE

CROSS REFERENCE TO RELATED APPLICATIONS

This application is based on and incorporates herein by reference Japanese Patent Application No. 2004-344806 filed on Nov. 29, 2004.

FIELD OF THE INVENTION

The present invention relates to an in-vehicle navigation device that retrieves an optimum route to a destination and guides a user or a vehicle along the route.

BACKGROUND OF THE INVENTION

An in-vehicle navigation device mounted in a vehicle retrieves an optimum route to a destination by using map data and guides the vehicle along the optimum route. In the map data, a road is expressed by links that are connected via nodes. The navigation device computes, with respect to each link and each node, a cost that indicates easiness in passing, and retrieves a route whose total cost of constituting links and nodes is minimum among routes from a starting position to a destination by the Dijkstra method.

However, thus retrieved route is not always preferable to users. A user may prefer to driving a road that is narrower but shorter, or to driving a road that is more detouring but less traffic. In this case, the preferred road may not correspond to the low cost road. Furthermore, a preferred road may be excluded from roads used for route retrieval because of being too narrow or one-way traffic. In this case, the preferred road is never retrieved as a part of the optimum route.

To solve this problem, a navigation device in Patent Document 1 is provided with the following. When a subject vehicle travels a certain route (referred to as a deviation route) different from an initially retrieved route, the deviation route is stored along with its deviating position from the retrieved route and its returning position to the retrieved route. When the deviating position and the returning position are thereafter included in a retrieved route, a part of the route therebetween can be replaced with the deviation route that was previously traveled. In other words, the deviation route is treated as a route preferred by a user, so the deviation route can be included in a guiding route.

However, the deviation route is not always a preferred route even when a user takes the deviation route. For instance, a deviation route might be reluctantly taken or traveled because of road traffic closure or road repairing. Furthermore, in this case, a route corresponding to the road traffic closure can be bypassed from any one of multiple deviating position candidates to any one of multiple returning position candidates.

Here, in Patent Document 1, when both the deviating position and the returning position previously stored are included within a retrieved route that is thereafter newly retrieved, the impassable route can be prevented from being selected. However, when both the deviating position and the returning position previously stored are not included within a retrieved route, this retrieved route is selected without any specific replacement. Namely, for instance, when a retrieved route that is thereafter retrieved includes the same road traffic closure but does not include the previously traveled returning position to the previous initially retrieved route, this retrieved route is used for route guidance without any replacement although it includes the same road traffic closure that the vehicle previously bypassed.

Furthermore, it can be designed that information regarding the road traffic closure or road repairing is received via the VICS (Vehicle Information and Communication System) or the like and a route detouring around the impassable route is retrieved based on the received information. However, the VICS provides information mainly related to major roads, so roads other than the major roads cannot be included in the VICS information.

Patent Document 1: JP-2001-124578 A (U.S. Pat. No. 6,418,373 B1)

SUMMARY OF THE INVENTION

It is an object of the present invention to provide an in-vehicle navigation device to provide a route to a destination detouring around (or bypassing) an impassable road due to a road traffic closure, road repairing, or the like.

To achieve the above object, a navigation device mounted in a vehicle is provided with the following. A position detector is included for detecting a current position of the vehicle. A map data storing unit is included for storing road map data indicating a road using links. A setting unit is included for setting a starting position and a destination. A route retrieving unit is included for giving a cost to each of links included in routes from the starting position to the destination to obtain a total cost of costs of links included in each of the routes from the starting position to the destination and retrieving a route whose total cost is minimum among the routes from the starting position to the destination. A guiding unit (or guidance unit) is included for guiding the vehicle to the destination along the retrieved route. A determining unit is included for determining based on the current position whether the vehicle travels the retrieved route. A deviation route storing unit is included for storing (i) a deviation route that the vehicle travels after deviating from the retrieved route, (ii) a deviating position at which the vehicle deviates from the retrieved route to the deviation route and (iii) a returning position at which the vehicle comes back from the deviation route to the retrieved route, when the vehicle is determined to travel the deviation route. A comparing unit is included for extracting a route included in the retrieved route from the deviating position to the returning position and comparing a cost of the extracted route and a cost of the deviation route. A detour coefficient assigning unit is included for assigning a detour coefficient to each of links included in the extracted route when the cost of the deviation route is larger than the cost of the extracted route. Here, the detour coefficient indicates that the vehicle detoured around (or bypassed) the links included in the extracted route. The route retrieving unit increases a cost of a link to which the detour coefficient is assigned when subsequently retrieving a route.

Under the above structure, when a vehicle deviates from an initially retrieved route (initial route) to a route (deviation route) different from the initial route, a cost or a route cost is compared between the deviation route and a non-traveled route included in the initial route. When the cost of the deviation route is larger or when deviating from the initial route is supposed to be conducted with a given purpose, a detour coefficient that indicates that the vehicle detours around a link to which the detour coefficient is assigned is assigned to links included in the non-traveled route. Thereafter, when a route retrieval is conducted, a cost of a link to which the detour coefficient is assigned is increased based on the detour coefficient. Namely, when route retrieval is conducted, a link to which the detour coefficient is assigned becomes a difficult to be selected as a link constituting an optimum route. This helps prevent a road that is impassable due to road traffic closure or the like to be selected as a part of the retrieved route.

Furthermore, this structure can be useful for a certain road that is not covered by information of the VICS in determining whether the certain road is impassable or not. When the certain road is determined to be impassable, the certain road can be prevented from being selected as part of a retrieved route.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFFED EMBODIMENTS

Figure 1:
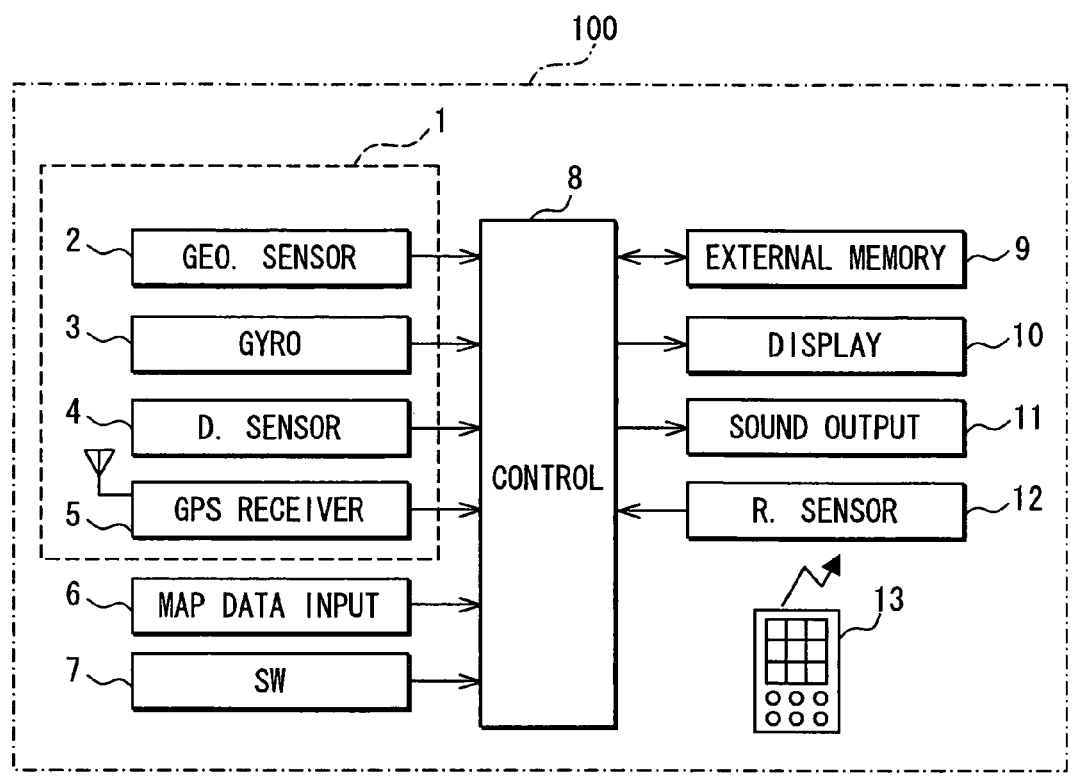
FIG. 1 is a block diagram of an overall structure of an in-vehicle navigation device according to an embodiment of the present invention.

An overall structure of an in-vehicle navigation device 100 mounted in a subject vehicle according to an embodiment of the present invention is shown in a block diagram of FIG. 1. The device 100 includes a position detector 1, a map data input unit 6, an operation switch group 7, an external memory 9, a display device 10, a sound output device 11, a remote control sensor 12, a remote controller 13, and a control circuit 8 connected with the foregoing devices or the like.

The control circuit 8 is a known computer including a CPU, a ROM, a RAM, an I/O, and a bus line connected with the foregoing components. The ROM is written with a program executed by the control circuit 8, and the CPU or the like executes various processing according to this program. This program is also obtained externally via the external memory 9. In this embodiment, when the subject vehicle is guided to a destination, a shortest route to the destination is retrieved using the map data read out from the map data input unit 6. When the vehicle deviates from an initial route, it is determined whether a deviation route corresponds to a detour route that eventually becomes a long way. When the deviation route determined to correspond to a detour route, a detour coefficient is assigned to each link constituting a non-traveled route that the subject vehicle has not traveled. The detour coefficient indicates that the subject vehicle detours around the each link. The detail will be explained later.

The position detector 1 includes known devices such as a geomagnetism sensor 2, a gyroscope 3, a distance sensor 4, a GPS (Global Positioning System) receiver 5 for the GPS detecting a current position of the subject vehicle based on radio waves from GPS satellites. The individual sensors or the like include individually different types of errors; therefore, multiple sensors are cooperatively used while complementing each other. Furthermore, the position detector 1 can consist of some of the sensors depending on the accuracy requirement. Yet furthermore, the position detector 1 can include a rotation sensor for a steering wheel, or a vehicle speed sensor for each following wheel. This position detector 1 detects the current position of the subject vehicle, while the control circuit 8 recognizes which position within a retrieved route the vehicle is traveling and guides the vehicle to follow the retrieved route.

The map data input unit 6 is used for inputting map data, background data, landmark data, or the like in a storage medium of a playback-only medium such as a CD-ROM, a DVD-ROM, etc., or a rewritable medium such as a memory card, a hard disk, etc.

The map data includes link data and node data. Each road on a map is divided by multiple nodes being intersecting, branching, or merging points, and a link is defined to be between the nodes. Connecting links forms a road. The link data includes a link ID identifying a link, a link length of the link, starting node coordinates (longitude and latitude) and terminating node coordinates (longitude and latitude), a road name, a road kind, a road width, the number of lanes, presence or absence of a left or right turn-dedicated lane and the number of the turn-dedicated lanes, and a speed regulation, etc. The node data includes a node ID assigned to each node, node coordinates, a node name, link IDs connected with the node, an intersection type, etc.

When a route from a passing point to a destination is retrieved, a passing cost indicating easiness in passing is computed with respect to each link and each node. This passing cost is computed based on the characteristics (link length, road kind, road width) of each link and a kind of right or left turn or straight advance in each node.

Furthermore, in this embodiment, when computing the passing cost for each link to which a detour coefficient is assigned, the computed passing cost is multiplied with the detour coefficient. Namely, the passing cost for the link to which the detour coefficient is assigned is larger than the passing cost for the link to which no detour coefficient is assigned.

A route whose totaling (or total cost) of passing costs of constituting links and nodes is minimum among routes from a starting position to a destination is retrieved by using the Dijkstra method or the like. When the detour coefficient is assigned to a certain link, the certain link is less included in a retrieved route than the certain link before the detour coefficient is assigned to the certain link.

Figures 3, 5:
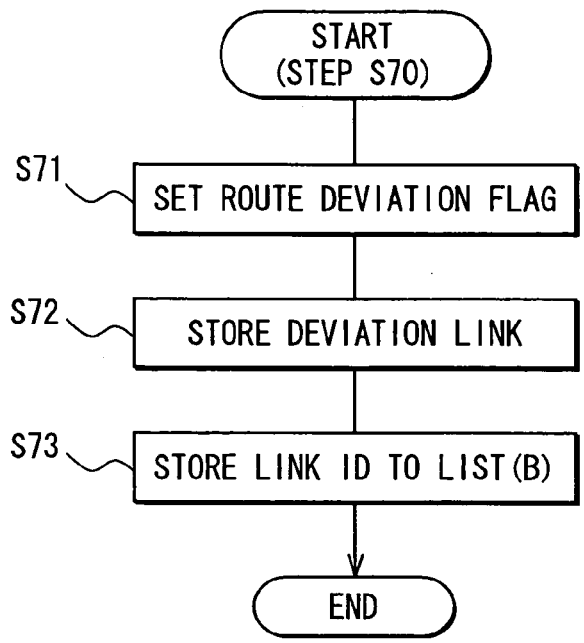
FIG. 3 is a flowchart of a process for storing a deviation route to which a vehicle deviates from an initial route.
FIG. 5 is a table of link IDs and detour coefficients of links to which detour coefficients are assigned.

The detour coefficient is assigned to a certain link as follows. There may be a case where the subject vehicle travels along a retrieved route and then deviates from the retrieved route (or takes a deviation route). When this deviation route is recognized as a detour route, links included in a route (non-traveled route) that the subject vehicle has not traveled are assigned detour coefficients. For instance, as shown in FIG. 5, link IDs and detour coefficients correspond to each other in a memory of the control circuit 8. When retrieving a route, this memory is referred to. Assigning the detour coefficient will be explained later with reference to a flowchart diagram.

The operation switch group 7 includes a touch switch or mechanical switches integrated into the display device 10 for use in inputting a starting position or a destination when retrieving routes.

The display device 10 includes a liquid crystal display to show a subject vehicle position indicating a current position of the subject vehicle detected by the position detector 1, and a road map surrounding the subject vehicle formed of map data, background data, or landmark data inputted via the map data input unit 6.

Furthermore, operating the operation switch group 7 or the remote controller 13 enables the scale of the road map to be changed to a given scale or the display of the road map to be scrolled. Furthermore, when a starting position and a destination are inputted by the switch group 7 or the remote controller 13, a route whose cost is minimum among routes from the starting position to the destination is automatically retrieved and a guided route is computed to be displayed on the display device 10.

The sound output device 11 includes a speaker and informs various information such as sound guidance in the route guidance.

The remote controller 13 includes a multi-functional remote controller to instruct the in-vehicle navigation device 100 to start or stop various navigational operations. This instruction can be executed also by the switch group 7.

Figure 2:
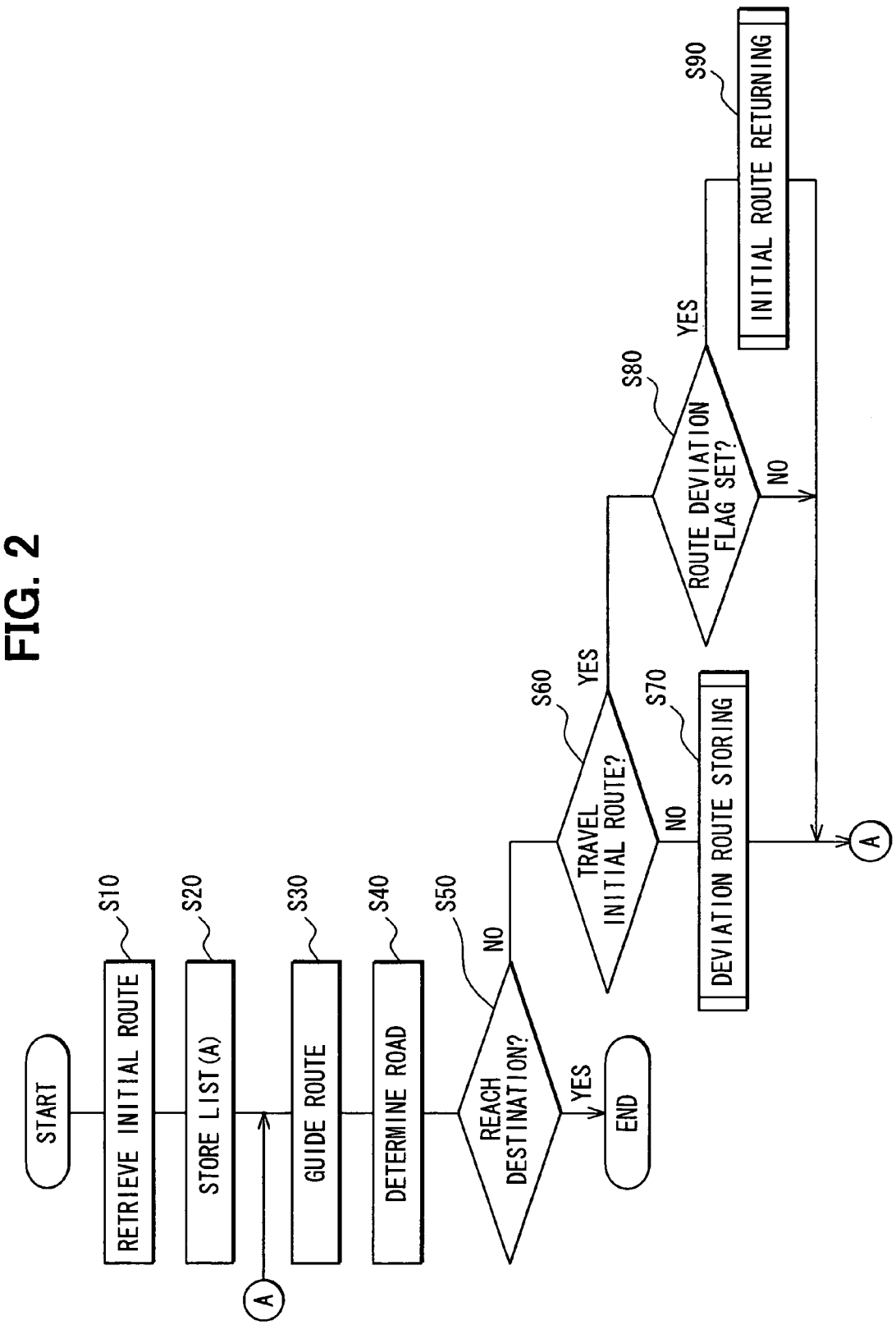
FIG. 2 is a flowchart of a process after an initial route to a destination is retrieved.

A process will be explained that is executed by the control circuit 8 from when a route is retrieved to when the subject vehicle arrives at the destination, with reference to FIG. 2.

At first, a driver needs to input a starting position and a destination. When only the destination is inputted, the starting position can be a current position detected by the position detector 1. Inputting or setting the destination or the like can be executed by using the switch group 7 or the remote controller 13.

At Step S10, an optimum route from the inputted starting position to the inputted destination is retrieved. In detail, the control circuit 8 reads out the map data from the map data input unit 6 and computes a cost indicating an easiness in passing with respect to each link data and each node data constituting the map data. Here, the memory of the control circuit 8 is referred to, and the cost usually computed is multiplied by the detour coefficient with respect to a link to which the detour coefficient is assigned. Next, a route whose total cost of constituting links and nodes is minimum among those of routes to the destination is retrieved by using a retrieval algorithm such as the Dijkstra method.

At Step S20, with respect to the route retrieved at Step S10 (hereinafter referred to as initial route), IDs of its constituting links are stored in the memory of the control circuit 8 as a list (A) of a link ID row (see FIG. 8).

At Step S30, route guidance is conducted to guide the subject vehicle to follow this initial route. In detail, for instance, the display device 10 displays the initial route and the current position of the subject vehicle computed based on the position detector 1 and the sound output device 11 outputs sound. The subject vehicle is thereby guided.

At Step S40, a road that the subject vehicle is traveling is determined to determine whether the vehicle is traveling along the initial route. In detail, which road the vehicle is traveling is determined by matching a detection result by the position detector 1 in the map data.

At Step S50, when the current position of the vehicle designated at Step S40 corresponds to the destination previously set (Step S50: YES) (i.e., when the vehicle reaches the destination), the process stops. In contrast, when the current position of the vehicle designated at Step S40 is determined not to correspond to the destination previously set (Step S50: NO), the sequence goes to Step S60. Here, it is determined whether the vehicle is traveling along the initial route. When the vehicle is determined to be traveling along the initial route (Step S60: YES), the sequence goes to Step S80, where it is determined whether a route deviation flag is present or absent. This route deviation flag is assigned when the vehicle deviates from the initial route. Therefore, when the vehicle does not deviate from the initial route, this determination is negated and the route guidance continues to be conducted at Step S30. Namely, while the vehicle is traveling along the initial route, the above process is repeated. Furthermore, when the determination at Step S80 is affirmed, this means a case that the vehicle once deviates from the initial route and then returns or comes back to the initial route. This case will be explained later.

In contrast, when the vehicle is determined to be deviating from the initial route at Step S60, the sequence goes to Step S70, where the deviation route is stored. In detail, this process will be explained with reference to a flowchart of FIG. 3.

First, at Step S71, the route deviation flag indicating the deviation from the initial route is set. At Step S72, a link of the initial route just prior to the deviation is stored. This link is referred to as a deviation link (or deviating link) (see FIG. 8) and used for extracting a route within the initial route that the vehicle does not travel.

At Step S73, a link ID corresponding to a road the vehicle is currently traveling is stored in the memory of the control circuit 8. Thereafter, the sequence returns to Step S30 in FIG. 2, and the above process is repeated. Namely, while the vehicle is traveling the deviation route deviating from the initial route, the process at Steps S30 to S70 is repeated simultaneously while the memory of the control circuit 8 continues to store or accumulate link IDs constituting the deviation route. Here, a list of link IDs is referred to as a list (B) (see FIG. 8).

When the vehicle deviates from the initial route, the control circuit 8 re-retrieves a route to the destination. Therefore, the route guidance at Step S30 is conducted based on the re-retrieved route.

When the vehicle thereafter comes back to the initial route, or when the determination at Step S60 is affirmed, it is determined at Step S80 whether the route deviation flag is set. Here, the route deviation flag is set when the vehicle deviated from the initial route (Step S71 in FIG. 3), so that the determination at Step S80 is affirmed. The sequence thereby goes to Step S90.

At Step S90, it is determined whether the deviation route corresponds to a detour route; when the deviation route is determined to correspond to a detour route, the detour coefficient is set to each link constituting, of the initial route, a route (or non-traveled route) that the vehicle has not traveled. In detail, this process will be explained with reference to a flowchart in FIG. 4.

Figures 8, 9:
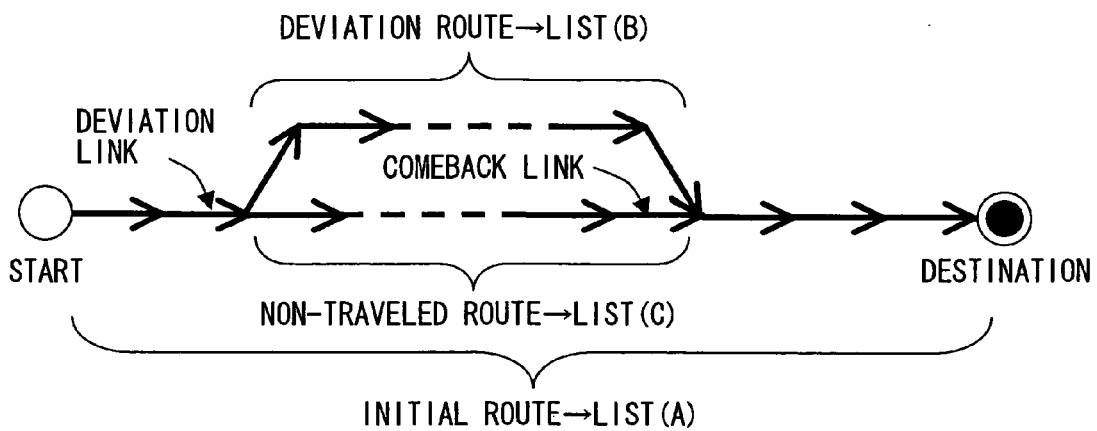
FIG. 8 is a diagram showing an initial route, a non-traveled route, and a deviation route.
FIG. 9 is a table of link IDs, directions, and detour coefficients of links to which detour coefficients are assigned according to a first modification of the embodiment.

At first, at Step S91, a comeback link (or returning link) is stored that is a link located within the initial route and just before a position where the vehicle returns to the initial route (see FIG. 8). At Step S92, IDs within the initial route between the deviation link and the comeback link are extracted as a list (C) (see FIG. 8). Namely, a route (hereinafter referred to as non-traveled route) corresponding to the list (C) has not been traveled by the vehicle with some kind of reason.

At Step S93, costs are individually computed with respect to the route corresponding to the list (B) and the list (C). This cost computation is conducted in consideration of a distance of the route, a time necessary for passing through the route, or various parameters of road kinds or the like. When the cost corresponding to the deviation route is computed, actually traveled time period can be used.

At Step S94, the computed costs for both the routes are compared to each other. When the cost for the list (C) is larger than the other, setting of the detour coefficient (this will be explained below) is not executed and the process is terminated.

This is because the detour route functions as a loophole or shortcut and there is less probability that the non-traveled route corresponds to a road being impassable due to the road traffic closure or the like. In this case, the sequence again returns to Step S30 in FIG. 2, the above process is repeated until the vehicle arrives at the destination.

Figure 6:
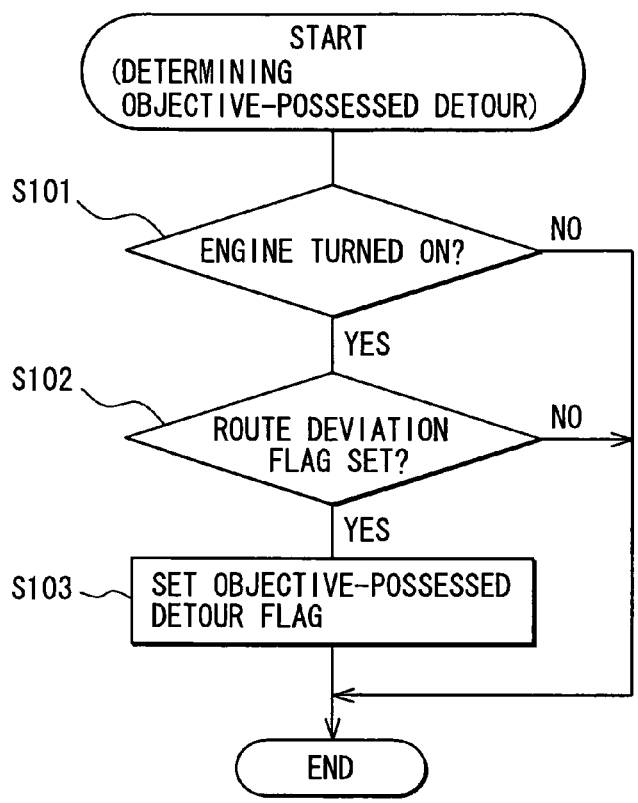
FIG. 6 is a flowchart of a process for determining whether a vehicle deviates from an initial route for a purpose when the vehicle deviates from the initial route.

In contrast, when the cost for the list (B) is larger than the other, the sequence goes to Step S95, where it is determined whether an objective-possessed detour flag is present. This flag indicates that the deviation is conducted due to a given objective, e.g., dropping around a certain position. Here, determination whether the vehicle deviates from the initial route with a given objective is determined based on a flowchart diagram in FIG. 6.

When it is detected that an engine is switched from an OFF state to an ON state at Step S101, it is checked whether the route deviation flag is present. When the route deviation flag is set, the objective-possessed detour flag is set at Step S103. Namely, turning off the engine indicates possibility of having dropped into a certain position, so that the objective-possessed detour flag is set as long as the vehicle is deviating from the initial route (or the route deviation flag is set). Furthermore, at Step S101, even when it is detected that the engine is switched from the OFF state to the ON state at Step S101, the objective-possessed detour flag is not set as long as the route deviation flag is determined to be not set at Step S102. Namely, while the vehicle is not deviating from the initial route, the objective-possessed detour flag is not set.

Figure 4:
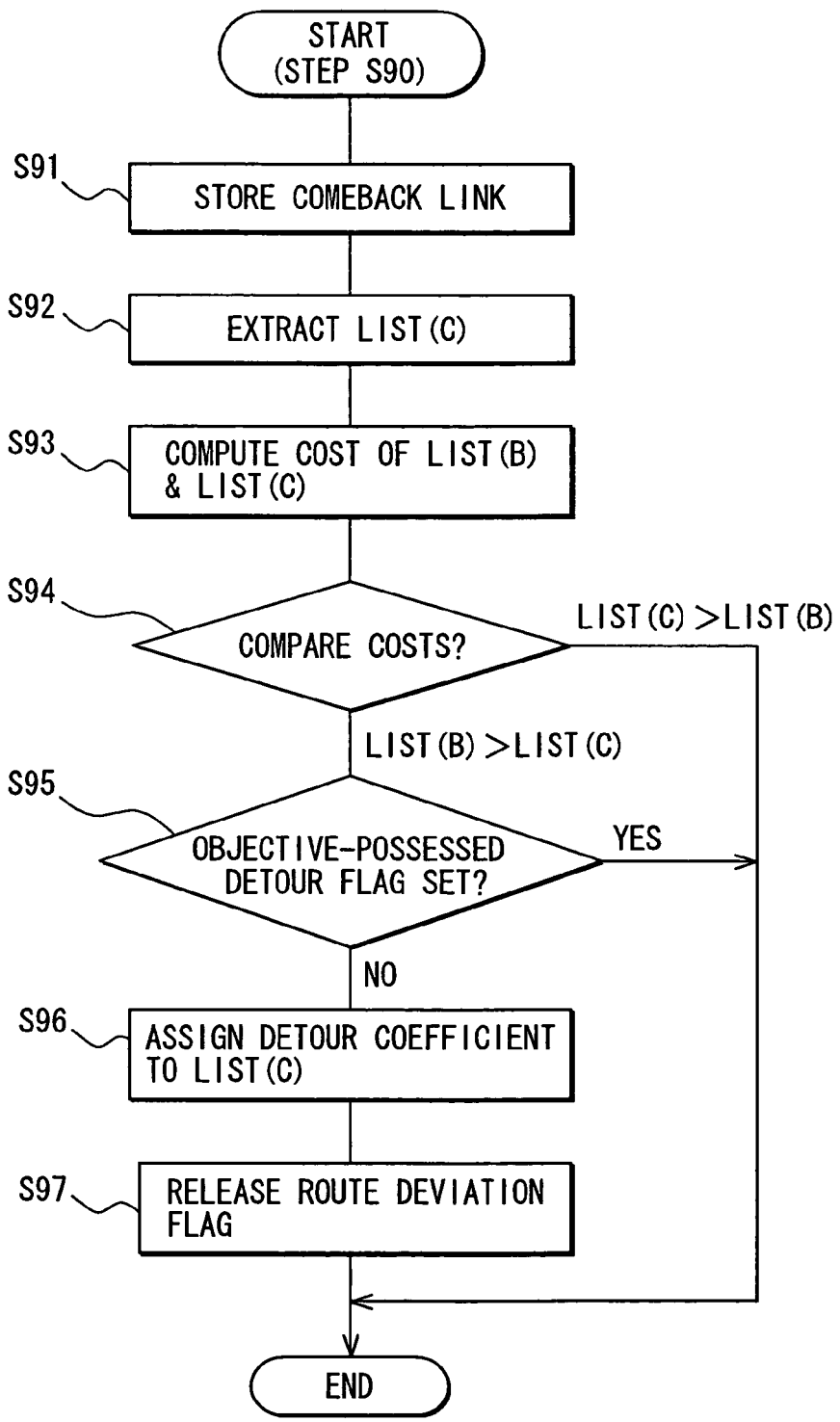
FIG. 4 is a flowchart of a process for assigning a detour coefficient to links of a non-traveled route included in an initial route when a vehicle comes back from a deviation route to the initial route.

Back to Step S95 in FIG. 4, when the objective-possessed detour flag is determined to be set after the above process takes place, the process is terminated without setting the detour coefficient. This is because the vehicle deviated from the initial route so as to drop into a certain position and there is less probability that the non-traveled route corresponds to a road impassable due to the road traffic closure or the like. In this case, the sequence returns to Step S30, and repeats the above process until the vehicle arrives at the destination.

In contrast, when the objective-possessed detour flag is determined to be not set at Step S95, it is supposed that there is large possibility that deviating from the initial route is due to the road traffic closure or the like and thereby the detour coefficient is set to the list (C) (see FIG. 5). Here, with respect to a link that has been already assigned the detour coefficient, the currently set detour coefficient is updated by being multiplied again by the detour coefficient (see FIG. 5). Namely, as a frequency the vehicle detours around a certain route or road becomes larger, the certain route is less retrieved as part of the retrieved route.

Thereafter, at Step S97, the route deviation flag is released since the vehicle returns to the initial route. Then, the sequence returns to Step S30 in FIG. 2, where the above process is repeated until the vehicle arrives at the destination.

As explained above, setting the detour coefficient to a link results from the possibility that the road corresponding to the link is impassable due to the road traffic closure or the like. However, a road does not always correspond to a road being constantly impassable even when the vehicle detoured around the road once. Namely, there may be a case where the road was under road repairing and temporarily impassable. In this case, continuing setting the detour coefficient even though the road becomes passable is unreasonable.

Figure 7:
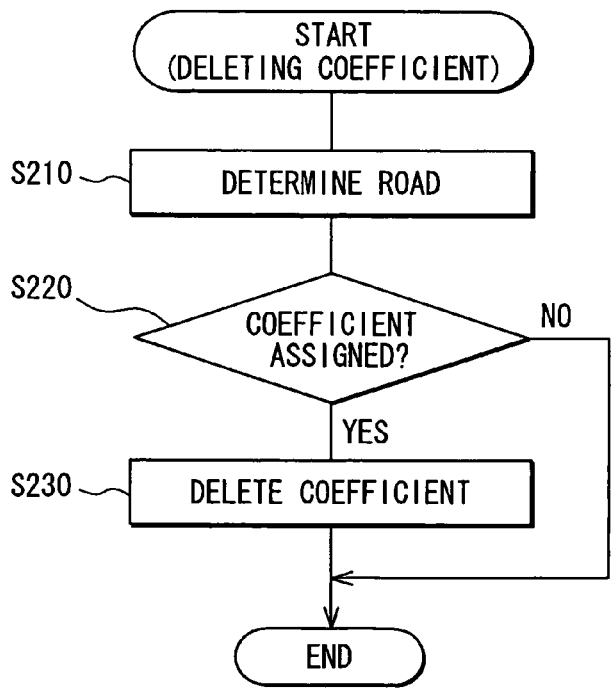
FIG. 7 is a flowchart of a process for deleting a detour coefficient when a vehicle travels a link to which the detour coefficient is already assigned.

In consideration of this case, a process for deleting the detour coefficient when a road corresponding to a link being set with the detour coefficient will be explained with reference to a flowchart in FIG. 7.

At Step S210, which road the vehicle is currently traveling is determined based on a detection result by the position detector 1. Then, at Step S220, it is determined whether a link corresponding to the road is set with the detour coefficient. This is conducted by referring to the memory of the control circuit 8 where IDs of links to which the detour coefficients are set are stored. When the link corresponding to the road where the vehicle is currently traveling is determined to be not set with the detour coefficient, no specific process is necessary and thereby the sequence passes through this flow.

In contrast, when the link corresponding to the road where the vehicle is currently traveling is determined to be set with the detour coefficient, the detour coefficient is deleted since the road is currently passable. The above process is repeated while the vehicle is traveling. When a certain road is once assigned the detour coefficient and then becomes passable, the assigned detour coefficient is deleted by subsequent traveling of the certain road. Therefore, the certain road that is currently passable can be prevented from being excluded when the route retrieval is thereafter conducted.

As explained above, in the in-vehicle navigation device 100 of the embodiment, a detour coefficient is assigned to a link corresponding to a non-traveled road that the vehicle did not travel when the vehicle deviates from the initial route and the deviation route is determined to correspond to a detour route. When the subsequent route retrieval is conducted, the cost of the link to which the detour coefficient is assigned is added based on the detour coefficient. The detour coefficient increases as the frequency of detouring around the link increases. Therefore, a road that is impassable due to road traffic closure or the like can be securely excluded from targets for the route retrieval as the frequency of detouring increases.

In this embodiment, as shown in FIG. 5, the detour coefficient is set to 1.5; however, the value can be any one. Furthermore, when the detour coefficient is already assigned, this coefficient is updated by being multiplied by the new detour coefficient; however, this updating can be differently conducted.

In this embodiment, when the vehicle deviates from the initial route and then the non-traveled route is extracted, a deviation link where the vehicle has traveled just before the vehicle deviates and a comeback link being located just before a position within the initial route where the vehicle comes back are stored. Then, a deviating position where the vehicle deviates and a returning position where the vehicle comes back are designated by using the stored deviation link and the stored comeback link (see FIG. 8). However, as long as the deviating position and the returning position can be designated, another method can be alternatively used. For instance, an ID of a node corresponding to the deviating position and the returning position can be stored instead.

(Modification 1)

In this embodiment, when the detour coefficient is assigned to the link at Step S96, a direction of the link is not considered. Namely, when the road has mutually opposing (or bi-directional) lanes, which lane the vehicle can not travel is not considered. However, there is a case where only one direction is impassable due to the repairing or the like. In this case, it is not favorable that the lane being passable is affected by the detour coefficient. Therefore, when the detour coefficient is assigned to the link at Step S96, a direction of the link that is impassable can be simultaneously stored (see FIG. 9). In this case, when the route retrieval is conducted, the cost corresponding to the relevant direction is computed in consideration of the detour coefficient with respect to the link that the detour coefficient is assigned to.

(Modification 2)

Figure 10:
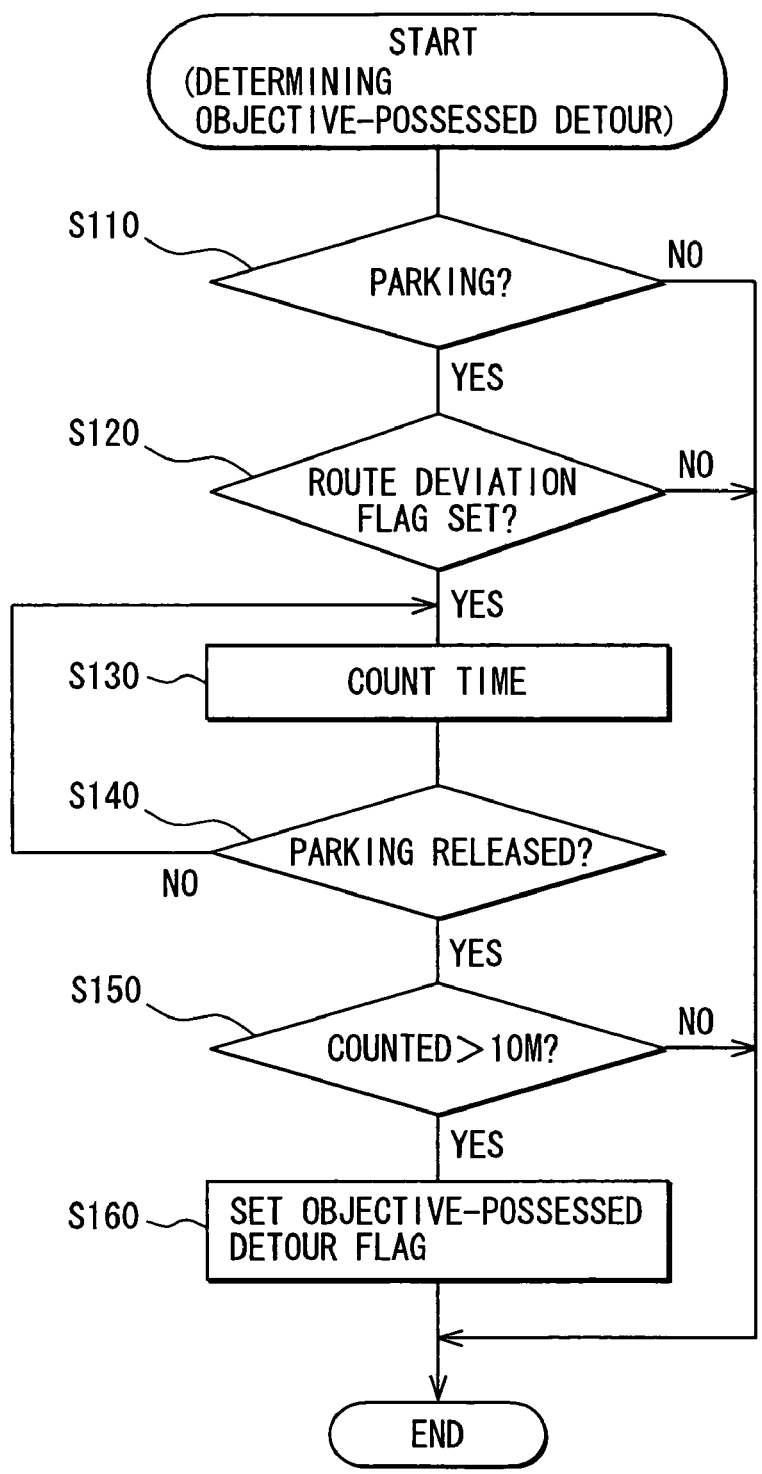
FIG. 10 is a flowchart of a process for determining whether a vehicle deviates from an initial route for a purpose when the vehicle deviates from the initial route according to a second modification of the embodiment.

In this embodiment, whether vehicle's deviating from the initial route results from a given purpose such as dropping into a certain position is determined by whether the engine is turned off or not. However, for instance, there is a case where the vehicle is parked and a user of the vehicle drops into a certain position while the engine being on the ON state. To suppose this case, the above determination can be done based on a flowchart in FIG. 10.

At Step S110, it is determined whether a shift position of the vehicle is switched to a shift position P (i.e., a parking position). This is achieved by connecting the control circuit 8 to a sensor to detect a shift position. Here, when it is not detected that the shift position is switched to the shift position P, there is high possibility that the vehicle is traveling. Therefore, the process for setting the objective-possessed detour flag is not subsequently conducted. In contrast, when it is detected that the shift position is switched to the shift position P, it is determined at Step S120 whether the route deviation flag is set or present. When the route deviation flag is determined to be not set, the vehicle is not deviating from the initial route, which dispenses with setting of the objective-possessed detour flag. The process then ends.

In contrast, when the route deviation flag is determined to be set, the vehicle is deviating from the initial route. At Step S130, a time is counted until the shift position P is released. When the shift position P is determined to be released at Step S140, it is determined whether the counted time is 10 minutes or more at Step S150. Here, when the counted time is less than 10 minutes, the objective-possessed detour flag is not set. This is because traffic congestion may cause the vehicle to stop. In contrast, when the counted time is 10 minutes or more, the objective-possessed detour flag is set at Step S160 since there is high possibility that a user may drop into a certain position with the engine turned off.

Furthermore, at Step S110, the vehicle's stop is determined by whether the shift position is switched to the shift position P; however, any method for detecting the vehicle's stop can be used.

Furthermore, at Step S150, the threshold value for the counted time is 10 minutes; however, any time period can be set.

A process may be executed using a CPU, a ROM, and the like. Here, steps in the process may be constructed as means or units in program stored in the ROM or the like.

It will be obvious to those skilled in the art that various changes may be made in the above-described embodiments of the present invention. However, the scope of the present invention should be determined by the following claims.

What is claimed is:

1. A navigation device provided in a vehicle, the navigation device comprising:
   a position detector for detecting a current position of the vehicle;
   a map data storing unit for storing road map data indicating a road using links;
   a setting unit for setting a starting position and a destination;
   a route retrieving unit for giving a cost to each of links included in routes from the starting position to the destination to obtain a total cost of costs of links included in each of the routes from the starting position to the destination and retrieving a route whose total cost is minimum among the routes from the starting position to the destination;
   a guiding unit for guiding the vehicle to the destination along the retrieved route;
   a determining unit for determining based on the current position whether the vehicle travels the retrieved route;
   a deviation route storing unit for storing (i) a deviation route that the vehicle travels after deviating from the retrieved route, (ii) a deviating position at which the vehicle deviates from the retrieved route to the deviation route and (iii) a returning position at which the vehicle comes back from the deviation route to the retrieved route, when the vehicle is determined to travel the deviation route;
   a comparing unit for extracting a route included in the retrieved route from the deviating position to the returning position and comparing a cost of the extracted route and a cost of the deviation route; and
   a detour coefficient assigning unit for assigning a detour coefficient to each of links included in the extracted route when the cost of the deviation route is larger than the cost of the extracted route, the detour coefficient indicating that the vehicle detoured around the links included in the extracted route, wherein
   the route retrieving unit increases a cost of a link to which the detour coefficient is assigned when retrieving a route.

2. The navigation device of claim 1, wherein
   when the detour coefficient is assigned to a link corresponding to the current position of the vehicle, the detour coefficient is deleted.

3. The navigation device of claim 1, wherein
   when a link to which the detour coefficient is to be assigned is already assigned the detour coefficient, the detour coefficient already assigned is updated to be increased.

4. The navigation device of claim 3, wherein
   the detour coefficient already assigned is updated to be increased by being multiplied by a given coefficient.

5. The navigation device of claim 1, further comprising:
   an objective determining unit for determining, when the vehicle deviates from the retrieved route, whether the vehicle deviates for a given purpose, wherein
   when the vehicle is determined to deviate for the given purpose, assigning of the detour coefficient to each of the links included in the extracted route is stopped.

6. The navigation device of claim 5, wherein
   the objective determining unit determines that the vehicle deviates for the given purpose when an engine of the vehicle stops.

7. The navigation device of claim 5, wherein:
   the objective determining unit includes a stop determining unit that the vehicle stops and a stop time computing unit that computes a stop time period of the vehicle when the vehicle is determined to stop; and
   when the computed stop time period is a given time period or more, it is determined that the vehicle stops for the given purpose.

8. The navigation device of claim 1, wherein:
the detour coefficient assigning unit identifies a direction corresponding to a traffic direction of a link to which the detour coefficient is to be assigned, and then assigns the detour coefficient to the link with the assigned detour coefficient associated with the direction, and the route retrieving unit gives the cost to the link to which the detour coefficient is assigned in consideration of the direction of the link.

* * * * *